United States Patent [19]

Bennick, Jr.

[11] 4,283,129

[45] Aug. 11, 1981

[54] CAMERA FOR RECORDING THE OUTPUT OF AN INSTRUMENT

[75] Inventor: Edward T. Bennick, Jr., Fairfax, Va.

[73] Assignee: Quality Craft, Inc., Fairfax, Va.

[21] Appl. No.: 63,595

[22] Filed: Aug. 3, 1979

[51] Int. Cl.³ .............................................. G03B 29/00
[52] U.S. Cl. ................... 354/81; 346/110 R; 354/150; 354/160
[58] Field of Search ............ 354/75, 76, 81, 150, 354/160, 174, 276, 278; 346/110 R

[56] References Cited

U.S. PATENT DOCUMENTS

| | | | |
|---|---|---|---|
| 197,534 | 11/1877 | Wright | 354/161 |
| 622,315 | 4/1899 | Wreede | 354/161 |
| 1,983,108 | 12/1934 | Verdich | 354/150 X |
| 2,301,921 | 11/1942 | Willcox | 354/160 |
| 2,531,783 | 11/1950 | Mosca | 354/150 |
| 2,614,460 | 10/1952 | Miller | 350/181 |
| 2,854,901 | 10/1958 | Fathauer | 354/150 X |
| 2,983,915 | 5/1961 | Thornton | 346/110 R X |
| 3,149,903 | 9/1964 | Merrick | 346/110 |
| 3,250,197 | 5/1966 | Fladlien | 346/110 X |
| 3,259,008 | 7/1966 | Buck | 346/110 R X |
| 3,490,351 | 1/1970 | Cressey | 354/150 X |
| 3,592,115 | 7/1971 | Ando | 354/150 X |
| 3,684,365 | 8/1972 | Dahlquist et al. | 346/110 X |
| 3,743,412 | 7/1973 | Morse | 346/110 |
| 3,896,465 | 7/1975 | Takigawa et al. | 354/174 |
| 3,898,680 | 8/1975 | Asano | 354/174 |
| 4,001,847 | 1/1977 | McGrath | 354/174 |

Primary Examiner—John Gonzales
Attorney, Agent, or Firm—Schwartz, Jeffery, Schwaab, Mack, Blumenthal & Koch

[57] ABSTRACT

A camera is disclosed for mounting adjacent an instrument such as a cathode ray tube device for recording an image from the display screen thereof. The camera includes an enclosure with a first opening for cooperation with the display screen of the instrument and a second, large opening across which a standard film cassette is mounted. The film cassette is held in place by a lower stationary holder and an upper attaching device which includes a movable latch. The latch is manually movable between a latched and unlatched position. It is automatically held in the unlatched position after manual movement thereto, and it automatically moves into the latched position when a film cassette is brought into cooperating engagement with the large camera opening. The camera enclosure includes a floating inner frame having a surface which engages with the inside of the film cassette and which contributes to the positioning of the film cassette. The plane of this inner frame and thus of the film in the cassette is adjustable to ensure sharp focusing over the entire plane of the film. The camera utilizes a folded optics arrangement including a lens disposed between inclined mirrors for directing light from the display device in a zig-zag pattern to the film plane. The optical elements of this arrangement are all part of an optical unit which may be preassembled and adjusted as a unit, installed in the camera enclosure as a unit, and removed therefrom as a unit. Mounting of the camera is accomplished by a lock which extends beyond the customary plastic bezel mount and engages instead with a metal support on the instrument.

34 Claims, 14 Drawing Figures

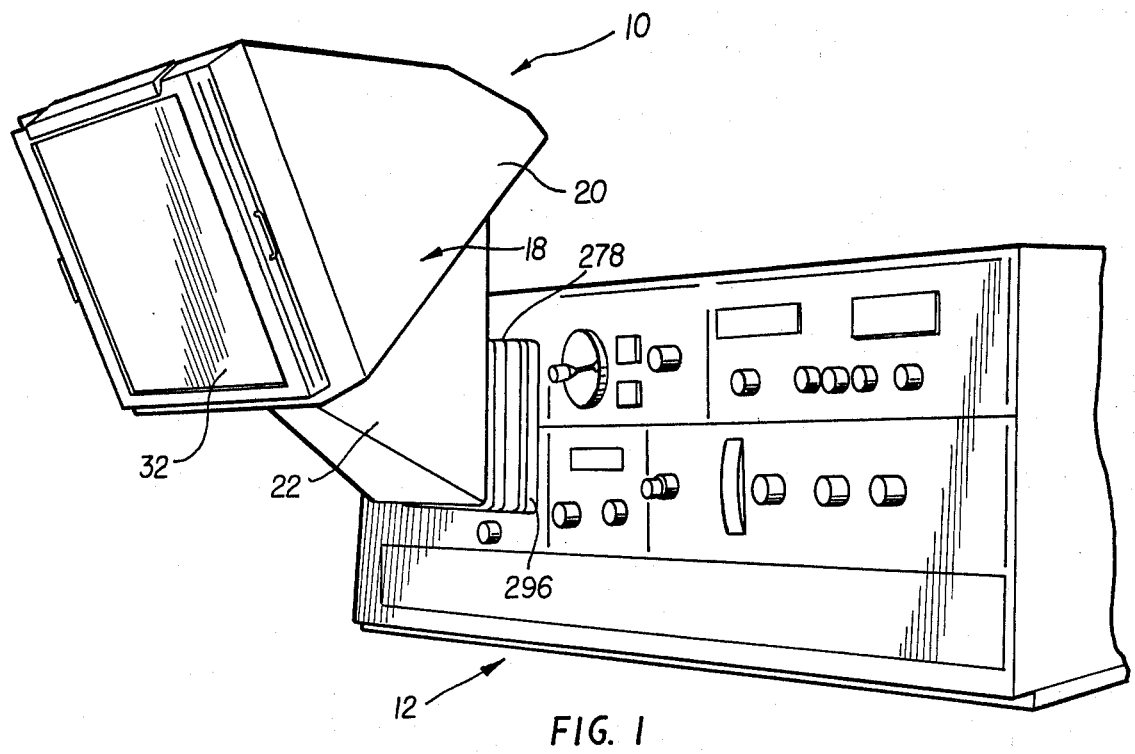
FIG. 1
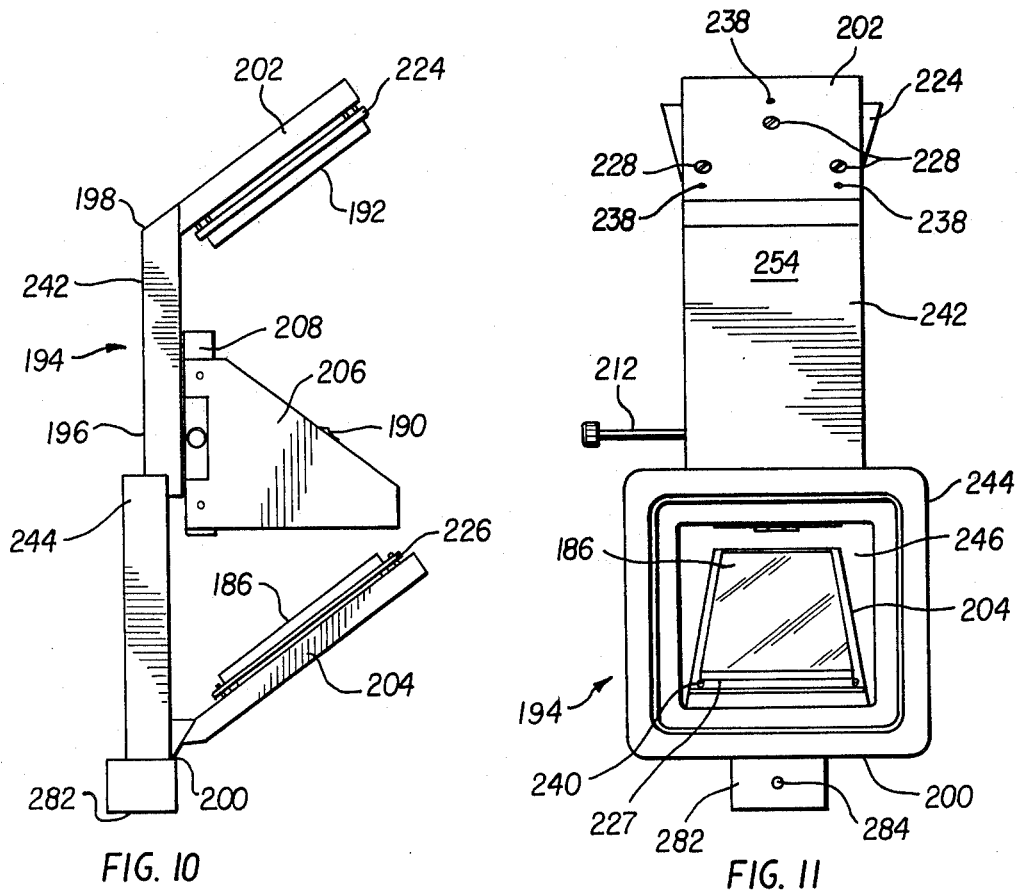
FIG. 10
FIG. 11

CAMERA FOR RECORDING THE OUTPUT OF AN INSTRUMENT

TECHNICAL FIELD OF THE INVENTION

The present invention relates to a camera to be mounted adjacent a display surface of an instrument for recording an image on the display surface with film. More particularly, the device relates to a camera to be mounted adjacent a cathode ray tube device to photograph the image on the cathode ray tube device.

DESCRIPTION OF THE PRIOR ART

It is known to record an image from the display surface of an instrument, such as a cathode ray tube device, by use of specially mounted cameras. Typically, such cameras use standard film cassettes containing film sheets in large format, such as an 8×10 inch format. In this regard, it is known to move the cassette into the focal plane of the camera by sliding the cassette through a slot in the side of the camera and removing the cassette by reversing the sliding movement.

A more convenient arrangement is also known in which the camera is fully open adjacent its focal plane and the cassette is simply put in the working position by placing it over the large opening to close the opening. The cassette is held in place by magnetic means in the form of strips surrounding the opening in the camera body and dispersed around the exterior of the film cassette. Such an arrangement is described in U.S. Pat. No. 4,001,847 to McGrath.

A drawback of this arrangement is that the most common commercially available film cassettes are constructed of plastic, and thus the film cassettes must be modified with metal or magnetic strips in order to effect attachment. Another drawback is that the metal or magnetic strips may be subject to wear or loosening, thus providing an imperfect light seal around the cassette.

Cathode ray tubes in general provide image outputs of very low light intensity, and thus a highly sensitive film is usually required. Also, cathode ray tube outputs often include important data or images toward the outer edges of the screen. This is particularly true where the cathode ray tube output involves multiple images in different segments of the screen. In view of the high sensitivity of the film and the importance of sharp definition over the entire film surface, small misalignments of the film plane with respect to the focal plane of the camera can create serious difficulties. When such misalignments are experienced in practice, they are generally difficult to correct.

To provide a compact camera and to minimize the cantilevered effect of mounting a camera on the mounting bezel of a cathode ray tube device, it is known to use a folded optics arrangement in a camera of the present type. The folded optic arrangement includes a lens and a plurality of inclined mirrors which direct the light through the camera in a zig-zag path. These elements, including the lens and mirrors are normally mounted in the camera enclosure. Assembly and, if required, disassembly of these optical elements may be rather difficult and time consuming. The situation is aggravated by the need for great precision in the positioning of the various optical elements and the alignment thereof with each other. The need for precision often requires very critical tolerances in the manufacturing of the camera enclosure. Also, once the optical elements have been positioned, it becomes very difficult to re-position them if a misalignment is found.

It is known to attach a camera to a plastic mounting bezel which is standard on certain types of cathode ray tube devices. This plastic mounting bezel surrounds the cathode ray tube and has four sides with longitudinal recesses therein. The known mounting arrangement includes use of a lock adjacent the mating opening on the camera, the lock having a pawl which extends into the recess of the plastic bezel. A drawback of this arrangement is that the mounted camera is sometimes subjected to unexpected outside forces such as by a person accidentally brushing against the camera. When this happens, the plastic bezel will often break in the portion where it is engaged by the pawl, and then the camera becomes unusable until the plastic bezel is replaced.

SUMMARY

It is an object of the invention to provide a camera in which the foregoing drawbacks of prior art devices are overcome or obviated.

It is another object of the invention to provide a camera for recording the output of an instrument which has the convenience of an open, readily accessible area at the camera focal plane and which at the same time uses a standard film cassette without any modifications to the film cassette.

It is a related object of the invention to provide a camera having the same advantages of convenience and accessibility and which does not require the use of mating magnetic and metal strips between the camera enclosure and film cassette.

Related objects of the invention include providing a camera of the foregoing type wherein the means for attaching the film cassette adjacent the focal plane opening of the camera enclosure is simple in construction, is particularly easy and effective in operation, allows for adjustability in the gripping of the film cassette, tends to provide a continuous inward pressure on the cassette toward the enclosure, automatically effects clamping of the cassette in the working position when the cassette is installed, and automatically moves the cassette slightly out of the working position to facilitate removal.

It is another object of the invention to provide a camera, the enclosure of which is constructed so as to facilitate the provision of, assembling of and installation of an attaching and positioning means for the cassette, which attaching and positioning means achieves the foregoing objects.

It is another object of the present invention to provide a camera of the present type in which any misalignments of the plane of the film with respect to the camera focal plane may be readily compensated for by adjusting the plane of the film through adjustment of a portion of the camera enclosure.

It is yet another object of the invention to provide a folded optics camera in which the optical elements may be easily installed, removed, and adjusted relative to one another.

It is a related object of the invention to provide a folded optics camera of the present type which does not require critical tolerances in the camera enclosure for mounting of the optical elements.

It is another related object of the present invention to provide a folded optics camera wherein the optical elements are all part of an optical unit separable from the camera enclosure, which optical unit is a unitary subassembly, which may be preassembled and adjusted as a unit, installed in the enclosure as a unit, and removed from the enclosure as a unit.

It is an additional object of the invention to provide mounting means for a camera of the present type including a lock which does not require engagement with the plastic bezel of the cathode ray tube device on which the camera is mounted but rather includes provisions for locking engagement with a metallic support in which the plastic mounting bezel is disposed.

It is still another object of the invention to provide a camera of the present type wherein at least a part of the foregoing mounting lock is integral with the foregoing optical unit.

These and other objects and advantages of the present invention will be apparent from the description which follows taken in conjunction with the accompanying drawing.

To achieve the foregoing objects and advantages, the present invention provides for a camera with an enclosure having a first opening for mounting about a display device of an instrument and a second opening, which is at least as large in area as the area of film to be exposed, for mounting a cassette, the camera including means for removably positioning the film cassette across the second opening of the enclosure such that a major portion of the film cassette serves as a closure for closing the second opening. This positioning means includes a stationary holder, extending from the enclosure for holding at least one lateral edge of the film cassette with respect to the second opening, and movable attaching means including a movable latch. The movable attaching means is coupled with the enclosure and disposed so that the movable latch engages with a lateral edge of the cassette. The latch has a portion extending outwardly with respect to the enclosure and a catch portion at the outer end. The attaching means also includes means for biasing the latch into the latched position and means for both holding the latch in the unlatched position after manual movement of the latch into the unlatched position and also for automatically releasing the latch from the unlatched position upon movement of the film cassette into the working position. This release allows movement of the latch into the latched position and thus into gripping engagement with the film cassette.

The stationary holder, which is disposed opposite the movable latch, includes an arm portion extending outwardly, the arm portion having an outer lip thereon which forms an obtuse angle with respect to the arm. Thus, an inclined surface on the stationary holder engages the cassette so as to urge the cassette inwardly against the camera enclosure into tight sealing engagement therewith.

The holding and automatic releasing means for the movable latch includes a movable control member having a bearing portion in the region of one end of the control member, an actuating button portion adjacent the other end and a grooved portion between the bearing portion and the actuating button portion. There is also a bore in the outer enclosure surface which engages the cassette, and this bore receives the control member therein for restraining the same to linear movement in a direction perpendicular to the plane of the second opening of the enclosure. There is a biasing means urging the control member outwardly of the bore, and there is a latch positioning member mounted on the latch and extending therefrom to the control member for cooperation both with the grooved portion thereof and the bearing portion thereof. A retaining member also cooperates with the grooved portion to retain the control member in the bore and to limit movement thereof within the bore. The control member is movable between a first position in which the button portion protrudes from the outer surface of the enclosure and a second position in which the button portion is approximately flush with the outer surface. In this arrangement, manual movement of the latch into the unlatched position moves the latch positioning member out of engagement with the grooved portion to permit movement of the control member into its first position so that the button portion thereof moves outwardly to push the film cassette slightly away from the outer surface to facilitate removal. The latch positioning member thereupon engages the bearing portion of the control member to hold the latch in the unlatched position. Thereafter, manual pressing of the film cassette into the working position across the second opening in the enclosure depresses the button portion and moves the control member into its second position. In this second position the latch positioning member drops into the grooved portion, thus allowing the latch to move into the latched position under the influence of the biasing means. The retaining member and latch positioning member of the automatic holding and releasing means are misaligned and staggered relative to one another, the retaining member being closer to the plane of the outer surface of the enclosure than the latch positioning member. The latch positioning member is adjustably movable with respect to the latch to effect adjustment of the position of the latch in its latched and unlatched position.

The biasing means for urging the latch into the latched position includes a spring having two flat parts joining each other and, when the biasing means is in a relaxed condition, disposed at an obtuse angle with respect to each other. One flat part of the biasing means is fixedly mounted and the other engages a top surface of the latch in unaffixed, abutting relationship therewith. Thus, this other spring part is free to slide with respect to the latch during movement of the latch between the latched and unlatched positions. The latch and catch portion are elongated in the direction of one side of the second opening to extend along that side. There is an enlarged pivot base on the latch opposite the catch, and the portion extending therebetween is in the form of a web. The pivot base of the latch is disposed in an elongated channel for accommodating pivotal movement of the latch, the channel including ears at either end for retaining the latch against longitudinal movement in the direction of the channel. The catch portion of the latch has a sloping surface disposed at an obtuse angle with respect to the extending portion or web of the latch. This sloping surface engages the cassette in inclined relationship therewith to thus urge the cassette against the outer surface of the enclosure when the latch is in the latched position.

The enclosure includes a main body portion and a separate, inner rectangular frame attached to the main body portion in spaced relationship thereto. The inner frame includes the aforementioned outer surface which engages with the film cassette. The inner frame is coupled with the main body portion of the enclosure by coupling means, and the inner frame generally surrounds the second opening and has a frame opening generally coextensive with the second opening. The coupling means for the inner frame includes a plurality of spaced biasing means between the main body portion of the enclosure and the inner frame, the biasing means urging the frame outwardly away from the main body portion. The coupling means also includes a plurality of adjustable fastening means extending between the main body portion and the inner frame, the adjustable fastening means opposing the outward urging of the inner frame by the biasing means and adjustably limiting the extent to which the inner frame is spaced from the main body portion. Thus, the inner frame assumes a floating relationship with respect to the main body portion of the enclosure. Accordingly, the plane of the outer surface of the inner frame may be adjustably moved with respect to the main body portion to effect proper focusing over the entire surface area of the film of the cassette.

The previously described cassette positioning means, including the stationary holder, the attaching means including the movable latch, and the means for holding the latch in the unlatched position after manual movement thereinto and for automatically releasing the latch from the unlatched position upon movement of the film cassette into the working position, are all mounted on or in this inner frame.

The camera of the present invention includes an optical unit coupled with the enclosure and disposed at least partially therewithin. The optical unit is separable as a unit from the enclosure and includes a bed portion. A pair of mirror mounting portions extend from the bed portion of the mirror at each end thereof in inclined relationship with respect thereto. The optical unit includes a first mirror on one of the mirror mounting portions for receiving an image through the first opening of the enclosure, i.e. through the opening which cooperates with the instrument having a display surface. There is a second mirror on the optical unit for transmitting the image directly to the second opening of the enclosure, i.e. the opening in the camera enclosure which cooperates with the film cassette. A lens is mounted on the bed portion of the optical unit and disposed between the first and second mirrors, the lens being adjustably movable with respect to the bed portion. The optical unit is a unitary optical subassembly which may be preassembled and adjusted as a unit, installed in the camera enclosure as a unit, and removed from the enclosure as a unit. This optical unit is a "folded optics" arrangement which directs the image in a zig-zag pattern through the camera enclosure to conserve space.

The bed portion of the optical unit has a portion with a central opening therein and another portion adjacent the centrally open portion which has a closed, plate-like configuration. The camera enclosure includes a portion in an attachment plane which is parallel with and closely adjacent to the display surface of the instrument when the camera is mounted for use. The first opening of the enclosure is disposed generally in the attachment plane, and the enclosure includes one face which is exposed to the exterior of the enclosure and spaced from the instrument when the camera is mounted for use, this face being disposed generally in the aforementioned attachment plane. This face is at least partially provided by the aforementioned closed portion of the bed portion of the optical unit. Also, the first opening of the enclosure is defined by the centrally open portion of the bed portion of the optical unit.

Each mirror of the optical unit is attached to a mirror mounting plate, each mirror mounting plate being connected with one of the mirror mounting portions of the optical unit by connecting means. The connecting means includes a plurality of spaced biasing means between each mirror mounting portion and mirror mounting plate. The biasing means urge each mirror mounting plate outwardly away from its associated mirror mounting portion. The connecting means also includes a plurality of adjustable fasteners extending between each mirror mounting portion and each mirror mounting plate. The adjustable fasteners oppose the outward urging of each mirror mounting plate by the biasing means to thereby establish the position of each mirror mounting plate and thus the position of its mirror with respect to each associated mirror mounting portion. There are three of the foregoing biasing means spaced apart and three similarly spaced fasteners between each mirror mounting portion and associated mirror mounting plate. Thus, each mirror has a three point adjustment so that the plane in which the mirror is disposed is fully adjustable.

The camera enclosure includes a wall extending across a lower part of the interior thereof, the wall being of one piece with the enclosure. The wall prevents any light which enters the enclosure through the first opening from passing beyond the wall, except such light as passes through a passageway in the wall. The passageway is generally aligned with a barrel in which the lens is mounted. A light-impervious bellows extends between the lens barrel and the passage in the wall, the bellows surrounding the lens and mating with the passage in the wall in light-sealing engagement therewith. Thus, substantially all light, entering the enclosure through the first opening from the display device and reflecting off one of the mirrors, passes through the passage in the wall and travels through the bellows to the lens without leakage.

The camera of the invention includes means in the region of the first opening for mounting the enclosure in surrounding relationship with respect to the display device of the instrument. The mounting means includes a mounting face surrounding the first opening, the mounting face including a camera bezel. The camera bezel in turn comprises a recessed face in the mounting face, the recessed face being defined by a shoulder around the recessed face. The shoulder and recessed face are both for supporting the camera on a certain type of plastic bezel which is standard in the industry for certain types of display devices.

The mounting means also includes a lock on the enclosure at the lower end thereof and disposed adjacent the aforesaid mounting face for removably securing the camera to the display area of the instrument. The lock includes a portion fixed with respect to the enclosure, the fixed portion having a shaft opening extending therethrough. This fixed portion of the lock is preferably integral, although not necessarily of one piece, with the aforementioned optical unit, and in particular with the bed portion thereof. A shaft extends through the shaft opening in the fixed portion, the shaft having a first end on one side of the fixed portion. Adjacent the first end there is disposed a manual gripping means. The shaft has a second end spaced from the fixed portion and adjacent which end there is disposed a pawl for locking cooperation with one of the recesses of a metal bezel support which is also standard in the industry for certain types of instruments having display devices and which supports the aforementioned plastic bezel. The pawl extends generally transversely of the shaft, the shaft having an extension which extends between the fixed portion of the lock and the pawl thereof a sufficient distance such that the pawl is positioned for cooperation with the recess in one of the side members of the metal bezel. Thus, in use, the shaft of the lock, and in particular the extension thereof, extends beyond the plastic bezel of the display device.

BRIEF DESCRIPTION OF THE DRAWINGS

FIG. 1 is a perspective view showing the camera of the present invention mounted on a cathode ray tube device, the cathode ray tube device being shown in fragmentary form.

FIG. 10 is a side elevation showing the optical unit of the camera of the present invention removed from the camera enclosure.

FIG. 11 is a rear elevational view (i.e. from the side which will face the cathode ray tube device in use) of the optical unit of FIG. 10.

DETAILED DESCRIPTION OF THE PREFERRED EMBODIMENT

Figure 2:
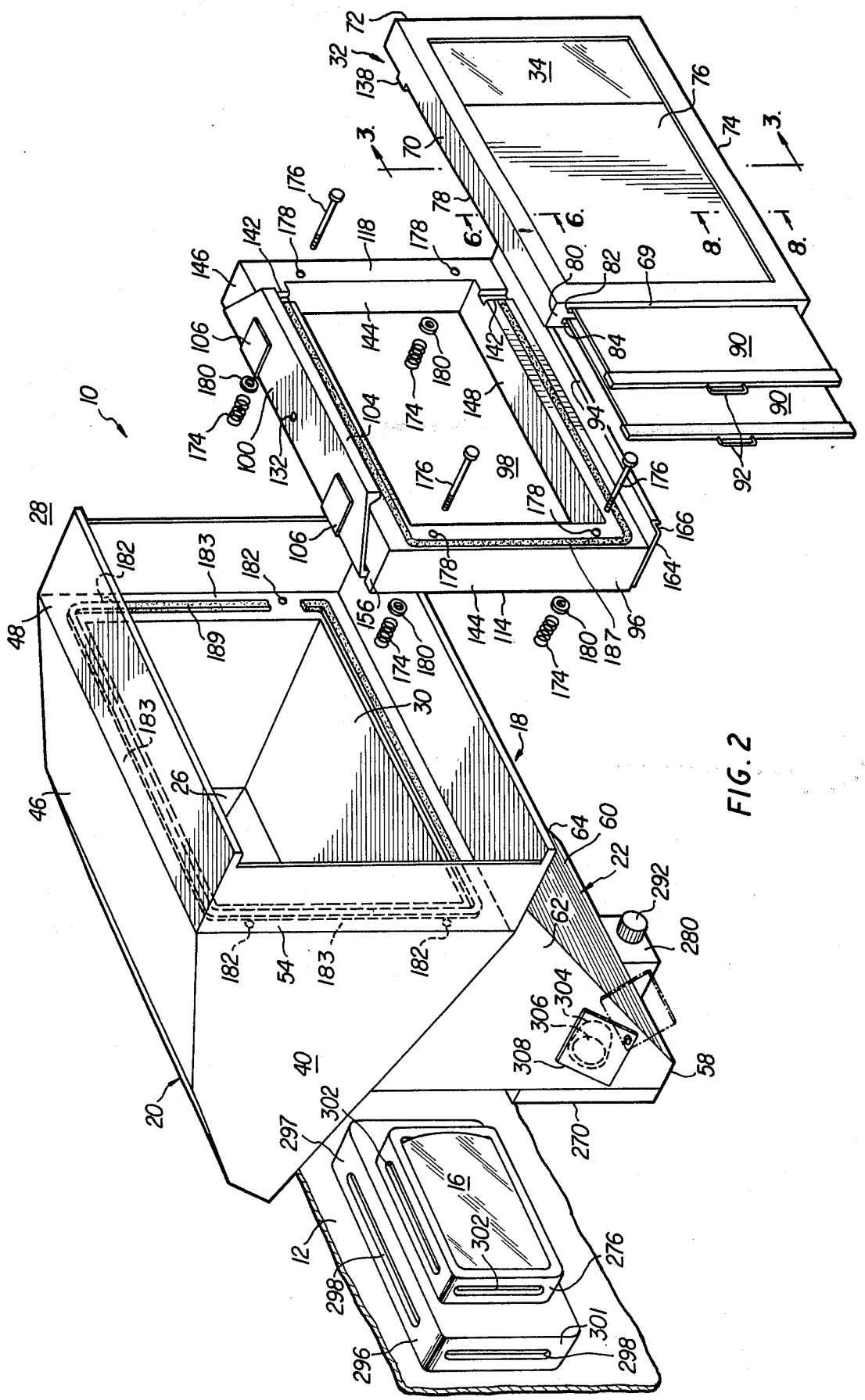
FIG. 2 is an exploded perspective view showing the camera of the present invention, a film cassette therefor, and a mounting bezel and bezel support of a cathode ray tube device.

In the following description and in the drawing, like reference characters used among the various figures of the drawing designate like elements or features.

The camera of the present invention is particularly useful for photographing a display surface of an instrument, particularly a cathode ray tube screen of a cathode ray tube device used in the field of nuclear medicine. While the camera described herein is particularly intended for the nuclear medicine field, the invention is not limited to use in this field. For instance, the present invention is useful in connection with photographing cathode ray tube outputs in a variety of technical and scientific fields as well as other fields. The invention, at least in certain of its aspects, and with certain modifications to the particular preferred embodiment described herein, will also be useful for photographing display surfaces on other instruments such as microscopes, telescopes, etc.

To be more specific as to the intended use of the camera of the particular preferred embodiment disclosed herein, the camera is especially intended for use with devices employed in electronic body scanning in the medical field, particularly the nuclear medicine field. In this field, it is known, for instance, to inject radio opaque dyes into a patient and to observe the dyes through radiological methods for diagnostic purposes. The results are produced on the screen of a cathode ray tube.

It becomes desirable in the nuclear medicine field to provide records of the body scans or other output of the cathode ray tube, particularly so that the results can be studied. It is for making such a record that the camera of the present invention is particularly suitable. In this regard, it is often desirable to provide a record showing a time sequence of events occurring within a patient's body, and to accomplish this the body scanning equipment is capable of producing multiple images on separate segments of the cathode ray tube screen, each image being taken at a specific time interval from the next adjoining image. Although displayed at different times, the individual images may be recorded on a single sheet of film to provide a record for studying dynamic conditions of the patient's body. The camera of the present invention is also suitable for providing photographs of this type.

The camera of the present invention is generally designated by reference character 10. FIG. 1 shows camera 10 mounted on a cathode ray tube device 12 which provides output readings from radiological body scanning equipment. Device 12 includes a cathode ray tube 14 having a screen or display surface 16 on which an image is displayed (see FIGS. 2 and 3).

Camera 10 includes an enclosure which is generally referred to by reference character 18. Enclosure 18 has a main housing portion 20 with a base portion 22 connected therewith. Base portion 22 is connected with the cathode ray tube device 12 and supports the main housing portion 20 from below.

Enclosure 18 includes a first opening 24 in base portion 22 thereof. Opening 24, of course, extends between the interior 26 and exterior 28 of the enclosure. Opening 24 surrounds cathode ray tube screen 16 in cooperating relationship therewith and is at least as large in area as the area of screen 16.

Enclosure 18 includes a second opening 30. Of course, opening 30 is between the interior 26 and exterior 28 of enclosure 18. Opening 30 cooperates with a rectangular film cassette 32 containing sheets of film 34 for photographing images on the cathode ray tube screen. Opening 30 is at least as large in area as the area of the film to be exposed.

The walls of main housing portion 20 of enclosure 18 generally diverge in a direction toward opening 30. Very roughly, main housing portion 20 has a wedge shape. The walls forming main housing portion 20 include a small rear wall 36 defining the narrowest portion or apex of housing portion 20 and a pair of sidewalls 38, 40 extending outwardly from and diverging from rear wall 36. Also diverging outwardly from wall 36 are rear upper wall 42 and lower wall 44, both of which are contiguous with lateral walls 38, 40. An upper sloping wall 46 is contiguous with walls 38, 40 and 42 and diverges outwardly from wall 42 in a direction toward opening 30. Upper and lower parallel front walls, 48, 50, respectively, extend to opening 30 and generally contribute to forming the upper and lower boundaries of opening 30. Upper parallel wall 48 is contiguous with upper sloping wall 46. Lower parallel wall 50 is contiguous with lower wall 44. There are also a pair of vertical parallel walls 52, 54 which are disposed in planes perpendicular to the planes of walls 48, 50 and which join walls 48, 50 to contribute to forming opening 30. Vertical wall 52 is contiguous with lateral wall 38 and vertical wall 54 is contiguous with lateral wall 40. The shape of main housing portion 20 and the location of the foregoing walls defining the same can best be seen by reference to FIGS. 2, 3, 4 and 5.

Base portion 22 also has a diverging, generally wedge-shaped configuration. Unlike main housing portion 20, base portion 22 can generally be said to diverge away from its primary opening to the exterior, i.e. opening 24. Actually, opening 24 is in one of the walls, namely, rear wall 56 (FIG. 4) of base portion 22. Opening 24 is also adjacent small, lowermost wall 58 from which a lower front wall 60 diverges in an upward, forward sloping direction to meet with the lower side of main housing portion 20 defined by walls 44 and 50 (see FIG. 3).

Figure 3:
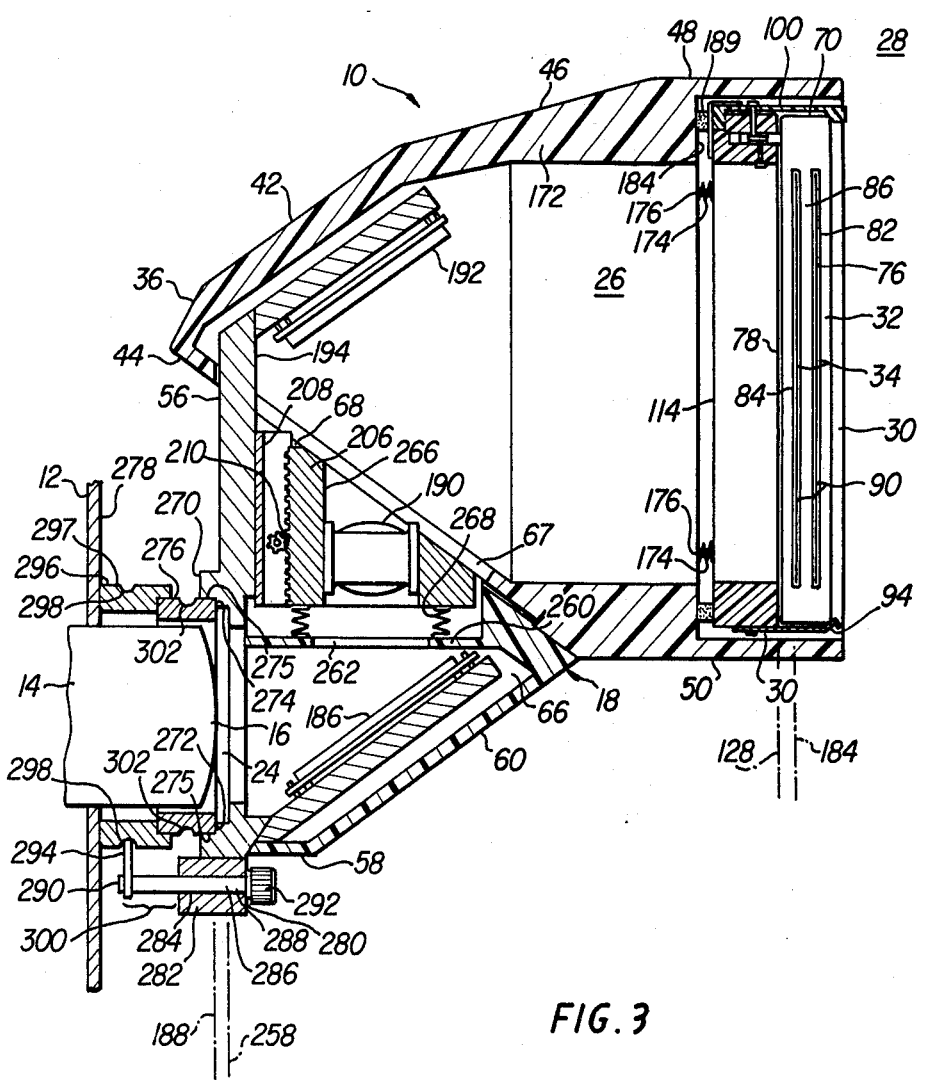
FIG. 3 is a cross-sectional view, taken on the line 3—3 of FIG. 2, of the elements shown in FIG. 2 in their assembled and attached conditions, except that lens 190 is shown in elevation rather than section.

Contiguous with walls 56, 58 and 60 of base portion 22 are a pair of upwardly extending sidewalls 62, 64 which, with the other walls of the base portion, define an enclosed interior space 66 in the base portion (FIG. 3). Sidewalls 62, 64 also join with the lower portion of main housing portion 20 defined by walls 44, 50.

In addition to openings 24, 30 which are open to the exterior of enclosure 18 and which are disposed in portions 20, 22, there are also openings 67, 68 in the main housing portion and base portion, respectively. Rather than being open to the exterior, however, openings 67, 68 simply open the base portion 22 and main housing portion 20 to each other (see FIG. 3). Opening 67 in main housing portion 20 is provided in lower wall 44 thereof. Opening 68 in base portion 22 is provided at the outwardmost diverging end of walls 56, 60, 62, and 64. Openings 67, 68 are in alignment and registry with each other so that, together, main enclosure portion 20 and base portion 22 define a single enclosed interior 26.

The film cassette 32 will preferably be a standard, readily commercially available cassette of the type which holds standard 8×10 inch sheets of film 34 (FIGS. 2 and 3). A suitable cassette of this type is manufactured and sold by Fidelity Manufacturing Company of Sun Valley, California. Cassette 32 has four lateral edges 69, 70, 72 and 74 and a pair of oppositely facing sides, 76, 78. Side 76 faces inwardly into interior 26 of enclosure 18 when cassette 32 is in a working position in registry with opening 24 as shown in FIG. 3. Side 78 faces outwardly when the cassette is in the working position.

Cassette 32 includes a rectangular frame 80 which will normally be constructed of plastic and a pair of oppositely disposed film slots 82, 84 separated by a central divider 86. Each of the film slots 82, 84 includes a track 88 for a dark slide 90. The film sheets 34 are disposed inwardly of the dark slides 90 and adjacent to central divider 86 (see FIGS. 7 and 8). With this construction, two sheets of film in a single cassette may be exposed. To expose the film sheet 34 nearest inwardly facing side 78 of cassette 32, the dark slide 90 adjacent and overlying that particular film sheet is removed via handle 92. After exposure, dark slide 90 is replaced in overlying relationship with the film sheet. Then, cassette 32 is released from the working position, its sides are reversed (i.e. the cassette is turned over) and then side 76 becomes the inwardly facing side. The film sheet closest to side 76 is then exposed in the same manner as the other film sheet.

Because light output from the screens of cathode ray tubes tends to be of low intensity, a highly sensitive film is used for the film sheets 32. This film may be of the X-ray type to facilitate processing in X-ray processors. Some of the more common films available which may be used are: Kodak SO179, Kodak RP/14, RPL/14 and XG/14; Dupont SF2, and Cronex Mamography.

When film cassette 32 is in the working position as shown in FIGS. 1, 3, 7 and 8 it is disposed completely across the opening 30 of enclosure 18 such that a major portion of film cassette 32 serves as a closure for closing opening 30 between the interior 26 and exterior 28 thereof. In this regard, too, it is to be recalled that opening 30 is at least as large as the area of film to be exposed. Thus, by virtue of the major portion of the cassette closing the large opening 30, the construction and arrangement of the film cassette 32 vis-a-vis the overall camera is entirely different from the well known side slot used in connection with large format film cassettes and from enclosed cassette or canister arrangements commonly used in portable cameras. The arrangement of the present invention, wherein the major portion of the film cassette 32 covers the opening 30, facilitates insertion, removal and turning of the cassette in view of the exterior location of the cassette and the freedom from obstructions. While such an exteriorly mounted cassette is not in itself new (see for example U.S. Pat. No. 4,001,847 to McGrath), the present invention provides a novel arrangement for removably positioning this type of exterior cassette in the working position.

The arrangement for positioning film cassette 32 across opening 30 in a working position as shown in FIGS. 1, 3, 7 and 8 includes a stationary holder 94 extending from enclosure 18 for holding at least the lowermost lateral edge 74 of the film cassette with respect to opening 30. Holder 94 is mounted on an inner frame 96 of enclosure 18. Inner frame 96 generally surrounds opening 30 and has a frame opening 98 generally coextensive with opening 30.

The positioning arrangement also includes a movable attaching device generally referred to by reference character 98. The movable attaching device including a movable latch 100 is mounted at the upper side of enclosure 18, and in particular is mounted on inner frame 96 of enclosure 18. Latch 100 is also disposed immediately adjacent opening 30 at the upper side thereof so as to engage with upper lateral edge 70 of film cassette 32. Latch 100 includes a portion 102 extending outwardly with respect to enclosure 18 and a catch portion 104 at the outermost part of outwardly extending portion 102. Latch 100 is movable between a latched position, as shown in FIGS. 3 and 7, engaging edge 70 of cassette 32 and an unlatched position, as shown in FIG. 6, out of engagement with cassette 32, thus permitting removal of cassette 32 from its working position in which it covers opening 30.

Figure 9:
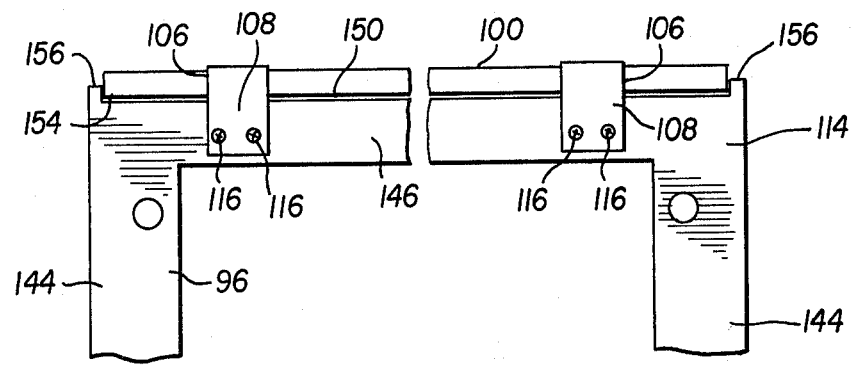
FIG. 9 is a fragmentary elevational view from the rear of the upper part of the inner frame.
Figure 5:
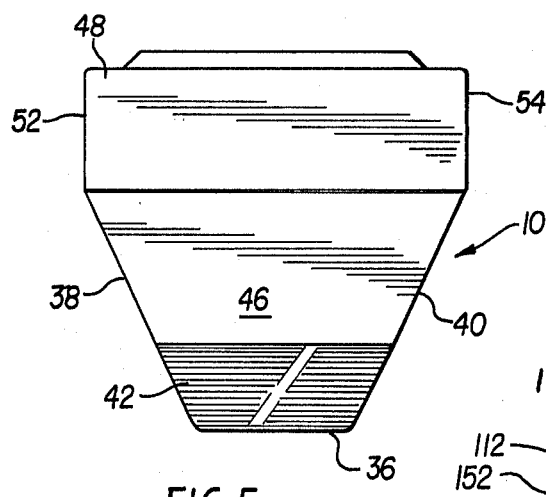
FIG. 5 is a top elevational view of the camera itself.
Figure 6:
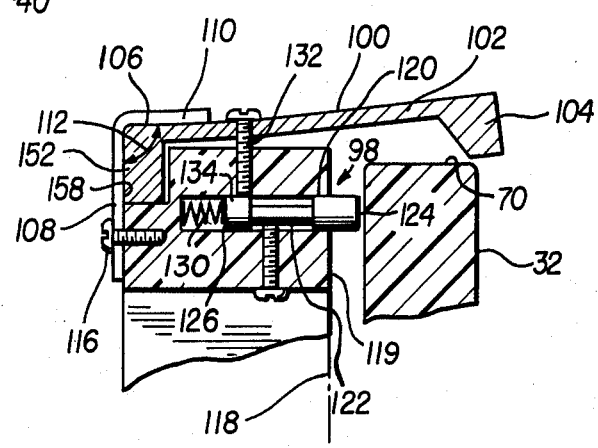
FIG. 6 is an enlarged, detailed, fragmentary sectional view through the inner frame of the camera of the present invention and showing the movable attaching device for the film cassette and showing the latch of the attaching device in the unlatched position.
Figure 7:
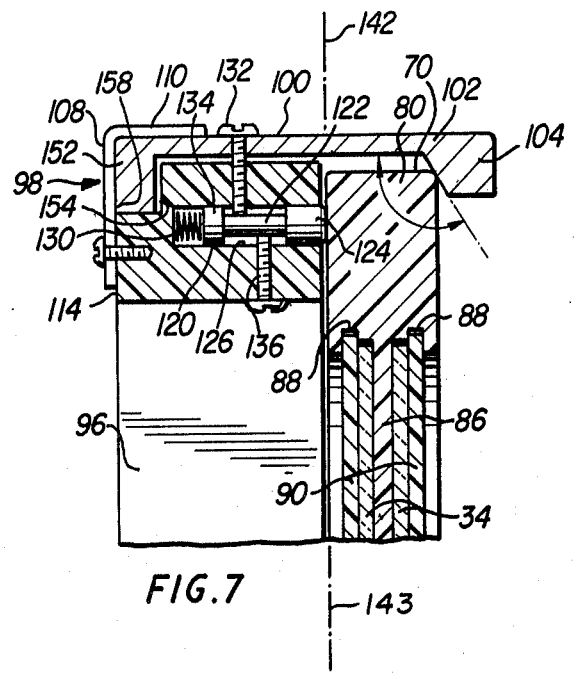
FIG. 7 is an enlarged, detailed, fragmentary sectional view similar to that of FIG. 6 but showing the latch in the latched position.

Latch 100 is biased into the latched position by a spring 106 which has a generally vertical flat part 108 and a generally horizontal flat part 110, parts 108, 110 joining each other and being disposed at an obtuse angle 112 with respect to each other when spring 106 is in the relaxed condition as shown in FIG. 6. Flat part 108 of spring 106 engages an inner surface 114 of frame 96 (see FIGS. 7 and 9) and is affixed thereto by fasteners 116. As will be seen from FIGS. 2 and 9, the movable attaching device 98 includes a pair of these flat springs 106 disposed in spaced apart relationship on either side of the center of frame 96.

Flat part 110 of each spring 106 engages the upper surface of latch 100 in unaffixed, abutting relationship therewith. Thus, flat part 110 of each spring is free to slide with respect to latch 100 during movement of the latch between the latched and unlatched positions. This provides for smoothness and certainty in the path of movement of the latch. In particular, the latch moves in a strictly pivoting movement governed by its abutment with frame 96, and the springs 106 only bias latch 100 for clockwise pivoting movement (as viewed in FIGS. 2, 6 and 7), i.e. springs 106 do not determine the path of movement.

The attaching device 98 both holds latch 100 in the unlatched position after manual movement of the latch into the unlatched position by the camera operator, and also automatically releases latch 100 from the unlatched position upon movement of film cassette 32 into the working position. This releasing action allows movement of latch 100 into the latched position and thus into gripping engagement with film cassette 32.

Enclosure 18, and in particular inner frame 96 thereof, includes an outer surface 118 surrounding opening 30. Outer surface 118 engages inner surface 78 of the film cassette 32 when the film cassette is in its working position.

To effect the holding of film cassette 32 against outer surface 118 and to release the film cassette therefrom, the attaching device 98 includes a movable control member which generally takes the form of a cylindrical pin. Control member 120 has a grooved portion 122 therein and actuating button portion 124. Control member 120 is disposed in a bore 126 in frame 96 of enclosure 18, bore 96 extending through outer surface 118. Bore 26 restrains control member 120 to linear movement in a direction perpendicular to the plane 128 (FIG. 3) of opening 30. That is, bore 126 and control member 120 are disposed parallel to the axis of opening 30 for movement of control member 120 in the axial direction. A spring 130 is disposed in bore 126 to bias control member 120 outwardly in a direction out of bore 126. Spring 130 is a coil spring held in compression between the bottom of bore 126 and the innermost end of control member 120.

To control the position of latch 100, attaching device 98 includes a latch positioning member 132 mounted on latch 100 and extending from the latch to the control member to cooperate with both the grooved portion 122 and a bearing portion 134 of control member 120, bearing portion 134 being disposed rearwardly of grooved portion 122. In particular, bearing portion 134 is located between grooved portion 122 and the end of control member 120 which engages spring 130.

A retaining member 136, in the form of a threaded screw extending partially through frame 96, extends into bore 126 to cooperate with grooved portion 122 of control member 120. Retaining member 136 limits the linear movement of control member 120 by providing a stop against which the ends of grooved portion 122 may engage when control member 120 reaches the desired limit of its movement. Most importantly, retaining member 136 prevents control member 120 from being pushed out of bore 126 by spring 130 when latch 100 is in the unlatched condition as shown in FIG. 6.

Control member 120 is movable between a first position as shown in FIG. 6 in which button portion 124 protrudes from outer surface 118 and a second position as shown in FIG. 7 in which the button portion is approximately flush with outer surface 118.

The operation of the movable attaching device will now be described. When it is desired to release a film cassette from the latched position, latch 100 is manually moved in an upward pivoting movement by the camera operator. This manual movement into the unlatched position moves latch positioning member 132 out of engagement with grooved portion 122 of control member 120 and permits movement of control member 120 (under the action of spring 130) into the above-described first position. During such movement, button portion 124 moves outwardly to push film cassette 32 slightly away from outer surface 118 to facilitate removal of the cassette. In this position, latch positioning member 132, having been moved upwardly along with latch 100, engages bearing portion 134 of control member 120 to hold latch 100 in the unlatched position. To replace a film cassette in the working position, the cassette 32 is simply manually pressed inwardly against outer surface 118, a standard tongue 138 on the cassette and a pair of mating grooves 142 in surface 118 facilitating alignment. This inward pressing of cassette 32 into the working position causes the inner side 78 of the cassette to depress button portion 124 to move control member 120 into the above-described second position in which latch positioning member drops into grooved portion 122. This, in turn, allows latch 100 to move into the latched position under the influence of the latch biasing springs 106.

It will be apparent that the foregoing movable attaching device 98 provides a simple and effective attachment of cassette 32 to enclosure 18. To attach the cassette it need only be pushed into place in opening 30 whereupon attaching device 198 automatically latches the cassette in tight, light sealing engagement with surface 118. To release the cassette it is only necessary to manually lift latch 100, which will automatically be retained in the unlatched position until the next cassette is pushed into place. The removal is further facilitated by the outward movement of button portion 124 as previously described.

It will be particularly apparent from FIGS. 6 and 7, that latch positioning member 132 and retaining member 136 are in misaligned and staggered relationship relative to one another, because otherwise positioning member 132 would not be able to be moved into engagement with bearing portion 134 where the grooved portion 122 is uniform on both sides of control member 120. In particular, it will be seen that retaining member 136 is closer to the plane 143 of surface 118 that is latch positioning member 132. To effect adjustment of the position of latch 100 in both the latched and unlatched positions, latch positioning member 132 is movable with respect to latch 100. In this regard, it will be seen that latch positioning member 132 takes the form of a screw extending through latch 100. Its position can be adjusted simply by threadably advancing or retracting member 132 with respect to the latch.

Frame 96 is defined by a pair of lateral side members 144, an upper member 146 perpendicular thereto and a lower member 148 parallel to upper member 146. Latch 100 is disposed in generally parallel, closely adjacent, face-to-face relationship with upper member 146, and in particular with upper side 150 thereof. Latch 100 and catch portion 104 thereof are elongated in the direction of upper member 146 to extend along upper member 146.

Latch 100 includes an enlarged pivot base 152 disposed opposite catch portion 104. Extending portion 102 of latch 100 extends between pivot base 142 and catch portion 104. As will be particularly apparent from FIGS. 2, 6 and 7, extending portion 102 is in the form of a web between pivot base 152 and catch portion 104.

Frame 96 includes a channel 154 extending generally parallel to upper side 150 thereof. That is, the channel extends along member 146 parallel thereto. Frame 96 includes a pair of upstanding ears 156 on either end of channel 154. Pivot base 152 of latch 100 is disposed in channel 154 for accommodating pivotal movement of latch 100 with respect to frame 96. In this regard, latch 100 pivots about fulcrum 158. Ears 156 retain latch 100 against longitudinal movement in the direction of channel 154 and provide hinging areas for pivot base 154. That is, pivot base 154 may bear against the surfaces on ears 156 which face inwardly toward each other.

Catch portion 104 of the latch 100 has a sloping surface 160 disposed at an obtuse angle 162 with respect to extending portion 102 of the latch. Sloping surface 162 engages edge 70 of the cassette and faces generally toward outer surface 118 of frame 96 but in inclined relationship with respect thereto. The slope of surface 160 translates the downward biasing force on latch 102 into an inwardly directed component to urge cassette 32 into constant, tight engagement against outer surface 118 when latch 100 is in the latched position.

Figure 8:
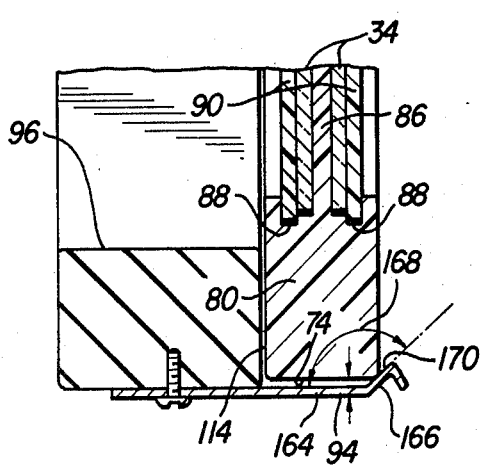
FIG. 8 is an enlarged, fragmentary, detailed sectional view taken on the line 8—8 of FIG. 2 showing the stationary holding device for the film cassette at the lower end of the inner frame.

A comparable inward force component is provided at the bottom edge 74 of cassette 32 by stationary holder 94 which is attached to lower member 148 of frame 96. It will be apparent that holder 94, as best seen in FIGS. 2 and 8, opposes movable attaching device 98, including latch 100, to hold the cassette in place. Stationary holder 94 includes an arm portion 164 extending outwardly from enclosure 18 in the region of opening 30 thereof, and in particular extending outwardly from frame 96 of enclosure 18. Arm portion 164 has an outer lip 166 thereon for engagement with side 76 of cassette 32. Lip 166 forms an obtuse angle 168 with respect to arm portion 164. Thus, the lip provides an inclined surface 170 for engaging side 76 of the cassette in such manner as to urge the cassette into tight engagement with the area of enclosure 18 surrounding opening 30, i.e. with surface 118. By virtue of the inclined surface 170, the bottom edge 74 of the cassette will normally be spaced a small amount, for example one-sixty-fourth inch from the arm portion. An inward force component created by sloping surface 170 of lip 166 stems from the downward force on the cassette from latch 100 and from the weight of the cassette.

Enclosure 18 may be regarded as having a main body portion 172 (FIG. 3) which does not include frame 96. That is, frame 96 is separate from main body portion 172 of enclosure 18. Inner frame 96 is attached to main body portion 172 in spaced relationship thereto by coupling means which include a plurality of spaced apart coil springs 174 and a plurality of spaced apart adjustable fasteners 76 extending between the main body portion 172 and frame 96. Fasteners 176 extend through bores 178 which pass through frame 96 in the axial direction, i.e. between surfaces 114 and 118 thereof. Fasteners 176 also extend through washers 180, and thence concentrically through springs 174 into holes 182 in a shoulder 183 in main body portion 172 of enclosure 18. Fasteners 176 threadably engage with holes 182. Springs 174, which are coil springs held in compression, urge frame 96 outwardly away from main body portion 172. At the same time fasteners 176 oppose this outward urging of frame 96 and adjustably limit the extent to which frame 96 is spaced from main body portion 172. With this arrangement, frame 96 assumes a floating relationship with respect to main body portion 172. In particular, the plane 143 of the outer surface 118 of frame 96 may be adjusted by fasteners 176 with respect to main body portion 172 to effect proper focusing of the image from the cathode ray tube 14 over the entire surface area of the film of the cassette 32.

This feature is particularly advantageous in the nuclear medicine field where very small misalignments of the plane of the film with respect to the plane of the image gives unsatisfactory results. Unlike in many photography applications, high definition at the edges of the film is required when recording body scans since important data may be contained there. This requirement becomes particularly critical where multiple images are recorded on a single sheet of film, as previously discussed. There, it is typical for sixteen separate images to be recorded in segments of a single film sheet, and it is obviously important that the images on the outer segments of the film sheet have proper definition. The importance of the plane of the film being exactly aligned with the focal plane of the image becomes even more important where highly sensitive film is used, as in nuclear medicine applications. The foregoing arrangement provides for an especially effective and easy adjustment of the plane of the film in order to ensure exact focusing over the entire film plane. It will be apparent that when the film cassette 32 is in engagement with outer surface 118 of frame 96, i.e. when the cassette is in the working position, plane 184 (FIG. 3) of film 34 in cassette 32 is disposed parallel to and closely adjacent plane 128 of opening 30 of enclosure 18.

To prevent leakage of light between surface 118 of frame 96 and the inwardly facing side 78 of cassette 32, when in the working position, light sealing means in the form of felt strips 187 are provided at least partially around face 118 and disposed in recesses thereof. Note that strips 187 engage side 78 of the cassette when in the working position. A light seal 189 is also disposed between frame 96 and main body portion 172.

Separate frame 96 and the above-discussed floating arrangement thereof with respect to main body portion 172 provides advantages in addition to the ease of adjustability of the film plane. In particular, it provides a structure which particularly facilitates use of the movable attaching device 98 including latch 100 as previously described.

In this regard, main body portion 172 of enclosure 18, which main body portion includes all of the main housing portion 20 except for frame 96 and its coupling mechanism and which includes most of base portion 22, is constructed of high density, rigid polyurethane foam plastic formed by known low pressure molding techniques. That part of main body portion 172 which is provided by main housing portion 20 is of one piece. It would be unwieldy, difficult and costly to provide the movable attaching device 98, including latch 100, springs 106, control member 120, bore 126, spring 130, latch positioning member 132, retaining member 136, channel 154, etc. in this one piece housing. The separate frame 96, however, provides a structure in which these elements may be effectively and economically provided. Like main housing portion 20, frame 96 is preferably constructed of rigid molded polyurethane plastic foam.

As can best be seen in FIG. 3, camera 10 uses a "folded optics" arrangement for transferring the image from a cathode ray tube screen 16 and focusing it upon film plane 184. Although it will be apparent from FIGS. 2 and 3 that the sheets of film 34 are located in two different planes, there will be only one film plane on which an image is projected. In FIG. 3, the sheet of film closest to side 78 is shown facing the interior of the camera, and that film sheet is disposed in plane 184 which receives the image from the cathode ray tube. The film sheet closest to side 76 will not be exposed until cassette 32 is released from the working position, reversed and put back into the working position and the dark slide 34 adjacent thereto removed.

The image from the cathode ray tube 16 is received on a lower mirror 186 which faces generally toward screen 16 but which is disposed at an incline with respect to the plane 188 in which the cathode ray tube screen 16 is generally disposed. Mirror 186 receives the image displayed on screen 16 and reflects it into lens 190. Lens 190, in turn, directs the image to upper mirror 192 which reflects it to film plane 184 of cassette 32 at the opening 30 of enclosure 18. As will be apparent from FIG. 3, upper mirror 192 faces but is disposed at an incline with respect to both lens 190 and opening 30. It will also be apparent that, with respect to the light path through enclosure 18, lens 190 is disposed between openings 24 and 30 in enclosure 18.

FIGS. 10 and 11 show, separate from the enclosure 18, the structure for carrying upper and lower mirrors 186, 192 and lens 190 which is disposed therebetween. As will be apparent from FIGS. 10 and 11, mirrors 186, 192 and lens 190, together with their supporting structure, form a discreet optical unit which is generally referred to by reference character 194. Optical unit 194 is separable as a unit from enclosure 18, and the optical unit has a bed portion 196 extending between upper and lower ends 198, 200, respectively. Optical unit 194 includes an upper mirror mounting portion 202 extending from bed portion 196 at upper end 198 thereof in inclined relationship therewith. Similarly, there is a lower mirror mounting portion 204 at the lower end 200 of said portion 196, lower mirror mounting portion 204 of the optical unit 194 also being disposed at an incline with respect to bed portion 196. The incline of mirror mounting portion 202 is approximately the same as the desired incline of upper mirror 192 with respect to opening 30. Similarly, the incline of lower mirror mounting portion 204 with respect to bed portion 196 is approximately the same as the desired inclination of mirror 186 with respect to enclosure opening 24. In a prototype, bed 196 and mirror mounting portions 202, 204, while being joined together as a unit, were made from separate pieces. It is anticipated, however, that in production the same elements 196, 202, and 204 will be of one piece.

It will be apparent that optical unit 194 provides a unitary optical subassembly which may be preassembled and adjusted as a unit, installed in enclosure 18 as a unit and removed from enclosure 18 as a unit.

Optical unit 194 has a lens mounting barrel 206 mounted on a track 208. Track 208, in turn, is mounted on bed portion 196. Between track 208 and lens mounting barrel 206 is a rack and pinion drive 210 (FIG. 3) including a manual adjusting stem 212 extending from interior 26 to exterior 28 of enclosure 18 (see FIG. 4). Manual adjusting stem 212 is coupled with the pinion of rack and pinion drive 210 to rotate the pinion and thus drive lens mounting barrel 206 linearly with respect to bed portion 196. This, in turn, adjusts the position of lens 190 to effect focusing thereof.

Figure 12:
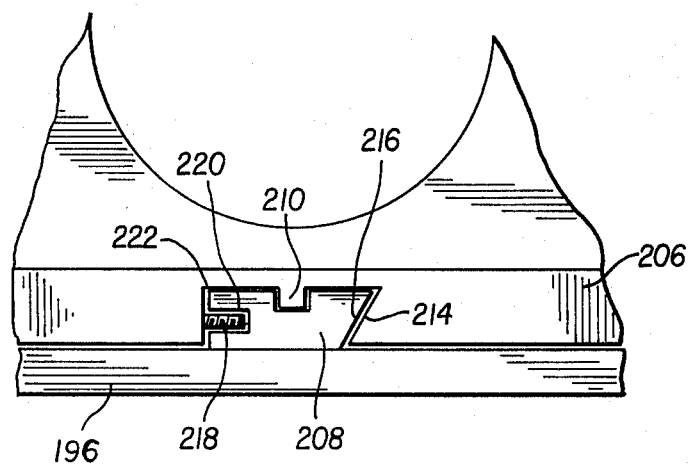
FIG. 12 is a fragmentary view of the bottom portion of the lens mounting barrel of the optical unit showing in particular the track therefor.

The manner in which lens mounting barrel 206 is coupled with track 208 is shown in FIG. 12. On one side of the track, lens mounting barrel 206 is held to the track by virtue of the mating cooperation of bevelled edge 214 of mounting barrel 206 with corresponding bevelled edge 216 of track 208. On the other side of track 208, mounting barrel 206 is held in place and guided with respect to the track by projection 218 extending from lens barrel 206 and cooperating with an inwardly extending groove 220 along track 208. Projection 218 may take the form of a screw-type fastener extending into slot 222 of lens barrel 206, slot 222 including the bevelled edge 214.

As will be apparent from FIG. 3, optical unit 194 extends between base portion 22 and main housing portion 20 of enclosure 18, upper mirror 192 being disposed in main housing portion 20 and lower mirror 186 being disposed in base portion 22. Lens 190 is disposed at least partially in base portion 22. In this regard, lens 190 may partially extend into main housing portion 20, particularly if its position is adjusted toward the upper end of track 208.

Upper mirror 192 is attached to a mirror mounting plate 224 by a layer of adhesive 225, such as silicone adhesive. (See FIGS. 13 and 14). Similarly, the lower mirror 186 is mounted on a lower mirror mounting plate 226 by adhesive 225. Mirrors 186, 192 are preferably of the type wherein the reflective surface is provided on the front side thereof, i.e. the side which receives the image, the reflective surface being provided by an aluminum oxide coating. This minimizes loss of light intensity as the light from the cathode ray tube is reflected off each mirror. Each mirror has the shape of a trapezoid and is larger at its lower end than at its upper end. Each mirror mounting plate, 224, 226 has substantially the same shape as its associated mirror, but each mounting plate is slightly larger than the mirror so that its edges are disposed a small distance outwardly of the mirror edges. In this regard, see outer edge portion 227 of mirror mounting plate 226 in FIG. 11 and FIG. 14.

Mirror mounting plate 224 and its associated mirror 192 is connected to upper mirror mounting portion 202 of optical unit 194 by a connecting arrangement which includes biasing devices 228. Similarly, lower mounting plate 226 with its associated mirror 186 is connected to lower mirror mounting portion 204 of optical unit 194 by a connecting arrangement including the same type of biasing devices 228. In connection with both the upper and lower mirrors, there are a plurality of spaced apart biasing devices 228.

Each biasing device 228 includes an interal compression coil spring 230 disposed in a housing 234 which has the external configuration of a screw fastener. Spring 230 of each device cooperates with a bearing 236 of each device 228, bearing 236 engaging the back side (i.e. the side opposite the mirror) of each mirror mounting plate 224, 226. Biasing devices 228 threadably extend through holes in the back sides of mirror mounting portions 202, 204, and the engagement of bearings 236 with mirror mounting plates 224, 226 urges the mirror mounting plates outwardly away from mirror mounting portions 202, 204. To oppose this outward urging, a plurality of adjustable fasteners extend between each mirror mounting portion and each mirror mounting plate, the fasteners at the upper end associated with plate 224 being designated by reference character 238, and the fasteners at the lower end associated with plate 226 being designated by reference character 240. There are three fasteners 238, 240 associated with each plate 224, 226, so that the fasteners form the apexes of a triangle (see mirror mounting portion 202 of FIG. 11). One biasing device 228 is disposed closely adjacent each fastener, so that the biasing devices also form the apexes of a similar triangle. Threadable advancement or retraction of each fastener 238 adjusts the reflection plane in which each mirror is located. By providing three points of adjustment, each reflection plane is fully adjustable.

Figure 13:
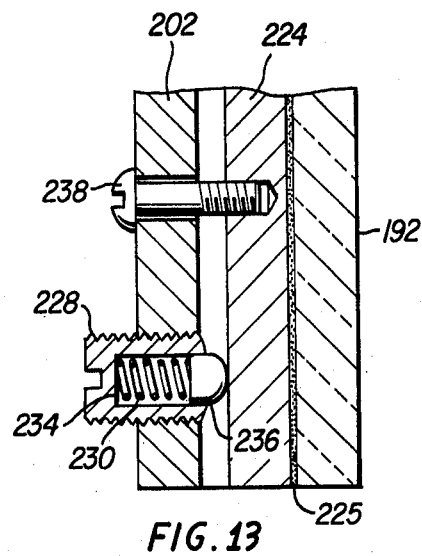
FIG. 13 is an enlarged, fragmentary sectional view through the upper mirror of the optical unit showing one of the three coupling means associated therewith.
Figure 14:
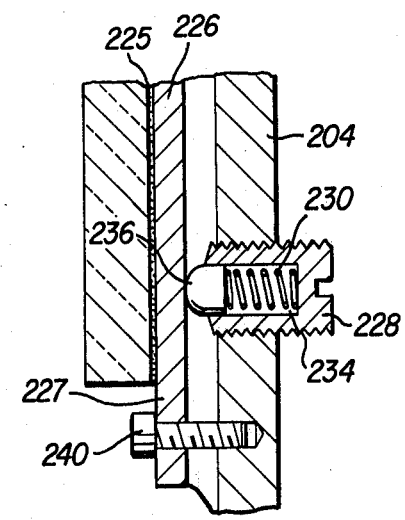
FIG. 14 is an enlarged, fragmentary sectional view through a lower portion of the lower mirror arrangement of the optical unit showing one of the three coupling means thereof.

It will be seen from FIGS. 13 and 14 that mirror mounting plate 226 is thinner than mirror mounting plate 224 and that the arrangement of the fasteners between the mirror mounting portion and mirror mounting plate is different for the upper and lower mirrors. In connection with the upper mirror 192, fastener 238 extends through mirror mounting portion 202 without threadable engagement therewith, and threadably engages mirror mounting plate 224 so as to be capable of being advanced or retracted with respect thereto. On the other hand, the fastener 240 associated with lower mirror 186 extends through mirror mounting plate 226 without threadably engaging the same and threadably engages with mirror mounting portion 204 so as to be capable of threadable advancement or retraction with respect thereto. Because fastener 240 simply extends through mirror mounting plate 226 and does not threadably cooperate therewith, mirror mounting plate 226 can be made considerably thinner than mirror mounting plate 224 and indeed is approximately half the thickness thereof. The type of floating mounting arrangement shown and described in connection with lower mirror 186, however, requires a sufficiently large outer edge 227 on mounting plate 226 in which to locate fasteners 240.

Figure 4:
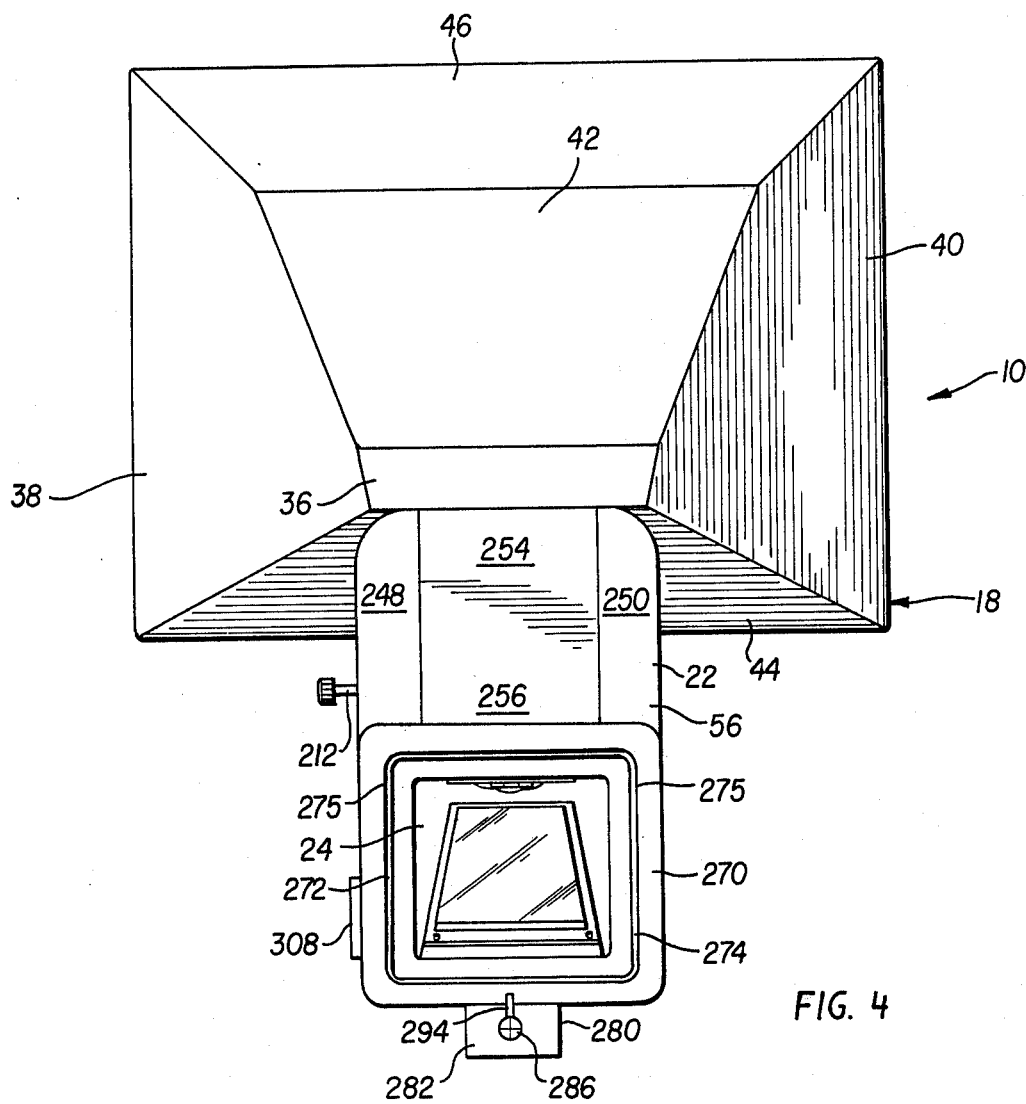
FIG. 4 is a rear elevational view of the camera of the invention disassociated from the cathode ray tube device.

As can be seen best in FIGS. 10 and 11, optical unit 194, and in particular bed portion 196 thereof, includes an upper portion 242 having a closed, plate-like configuration and, adjacent thereto and contiguous therewith, a lower portion 224 having a central opening 246 therein. While optical unit 194 is separable as a unit from enclosure 18, it can also be said that certain portions of optical unit 194 define parts of enclosure 18, albeit relatively small parts thereof. In particular, upper closed portion 242 and centrally open portion 244 of bed portion 196 define certain relatively small parts of enclosure 18. Referring to FIG. 4, base portion 22 of enclosure 18 includes a pair of surfaces 248, 250 which will face toward the cathode ray tube device 12 when camera 10 is mounted thereon. Surfaces 248, 250 are part of the molded, polyurethane base portion 22 and are separate from any part of optical unit 194. Nevertheless, surfaces 248, 250 are disposed in the same plane as the outer face 254 of closed portion 242 of optical unit 96 so that together surfaces 248, 250 and face 254 form a single flat face generally designated by reference character 256. Thus, closed portion 242 and its face 254 can be regarded as part of enclosure 18.

By the same token, centrally open portion 244 of optical unit 194 can be regarded as part of the closure, and in particular, centrally open portion 244 defines the above-discussed first opening 24 in enclosure 18. The first opening 24 is disposed in an attachment plane 258 which, as shown in FIG. 3, is parallel with and closely adjacent to the plane 188 of the display surface 16 of the cathode ray tube 14. Plane 258 may also coincide with plane 188. Face 256 is disposed generally in attachment plane 258, and when camera 10 is mounted on cathode ray tube device 12, faces 248 are exposed to exterior 28 of enclosure 18 and spaced from cathode ray tube device 12.

Base portion 22 of enclosure 18 includes a wall 260 extending entirely across enclosed interior space 66 thereof. Wall 260 is of one piece with base portion 22, i.e. it is integrally molded with the main plastic part of base portion 22. Wall 260 prevents any light which enters enclosure 18 through first opening 24 from passing therebeyond, i.e. beyond wall 260, except such light as passes through a passage 262 through wall 260. Passage 262 has approximately the same diameter as the diameter of the circular opening 266 in lens mounting barrel 206 and is generally aligned with the lens mounting barrel, and in particular with opening 266 thereof. A light-impervious bellows 268 extends between lens mounting barrel 206 and passage 262 in wall 260, bellows 268 surrounding lens 190 and mating with passage 262 in wall 260 in light-sealing engagement therewith. With this arrangement, substantially all light entering base portion 22 of enclosure 18 through first opening 24 and reflecting off mirror 186 passes through passage 262 in wall 260 and travels through bellows 268 to lens 190 without leakage. In other words, bellows 268 prevents leakage of light from interior space 66 of base portion 22 into the part of interior space 26 defined by the main housing portion 20 of enclosure 18.

It will be appreciated from the foregoing discussion that the separate optical unit 194 enables close tolerances of the optical elements to be easily established and maintained and that it greatly facilitates assembly and disassembly of the overall camera 10.

In a device in use prior to the present invention, a mirror comparable to the upper mirror 192 was positioned by glueing the same to a sloping surface in the main housing portion of the enclosure, i.e. the mirror was glued to a wall, comparable to wall 42 of main housing portion 20 of the device of the present invention. Similarly, a mirror comparable to lower mirror 186 was glued to a wall comparable to sloping, lower front wall 60 of the base portion. The lens was mounted in the plastic base portion, and it was necessary to machine the plastic base portion to a critical tolerance for mounting of the lens therein. Alignment of the lens, the mirrors, and the opening which surrounds the cathode ray tube are all critical, and in the old device, achieving the proper alignment could be a laborious process. Typically, alignment of the mirrors in the enclosure was accomplished by shims.

It can be seen that the optical unit 194 eliminates the need for close tolerances in the manufacturing of enclosure 18 and makes for a very easy adjustment of the optical components to achieve the necessary alignment. It also makes for very easy assembly, or disassembly as discussed. The separate optical unit 196 can be assembled as a unit and adjusted. Access to the various elements is completely open. The optical unit 194 can then be installed as a unit into enclosure 18. To accomplish this, upper end 198 of optical unit 194 is simply passed through opening 67 in main housing portion 20 when base portion 22 is removed therefrom. Base portion 22 is then simply slipped around the lower portion of optical unit 194, and these three components are then attached together by screw fasteners. Without further operations, all of the optical components will be in precise alignment with one another.

For mounting enclosure 18 on cathode ray tube device 12 in the region of opening 24 of the enclosure, there is a mounting arrangement including a mounting face 270 surrounding first opening 24, mounting face 270 including a camera bezel 272. The camera bezel 272 is provided by a recessed face 274 in mounting face 270, the recessed face being defined by a shoulder 275 around the recessed face 274. Recessed face 274 and shoulder 275 both support camera 10 on a plastic bezel 276 in a bezel area 278 of the cathode ray tube device 12.

The mounting arrangement also includes a lock 280 on enclosure 18 at the lower end thereof and disposed adjacent to mounting face 270 for removably securing camera 10 to bezel area 278 of the cathode ray tube device 12. The lock includes a portion 282 fixed with respect to enclosure 18, fixed portion 282 including a shaft opening 284 therethrough. As will be apparent from FIGS. 10 and 11, fixed portion 282 is integral with optical unit 194, and in particular with bed portion 196 thereof. Bed portion 196 is constructed of metal as is fixed portion 282 of lock 280, and this metal-to-metal mount ensures that lock 280 is securely fastened to camera 10. Integrally connected fixed portion 282 of lock 280 may be of one piece with bed portion 196 of optical unit 194.

A shaft 286 extends through shaft opening 284 in fixed portion 282 of lock 280. Shaft 286 has a first end 288 on one side of fixed portion 282 and a second end 290 on the other side thereof. Adjacent first end 288 is a manual gripping knob 292 for operating the lock. Adjacent second end 290 is a pawl 294 which extends transversely of shaft 286. Bezel area 278 of the cathode ray tube device 12 includes a metal bezel support 296 having sides 297 defining a rectangle and in which sides there are longitudinal recesses 298. Pawl 294 of lock 280 engages in locking cooperation with one of the recesses 298, in particular the lowermost such recess, to secure camera 10 about the bezel area 278 of cathode ray tube device 12. In this regard, shaft 286 of lock 280 includes an extension 300 which extends between fixed portion 282 and pawl 294. Extension 300 is of a sufficient length and extends a sufficient distance from fixed portion 282 that pawl 294 is positioned with cooperation with one of the recesses, i.e. the lowermost one, in one of the side members 297 of metal bezel support 296.

In previous devices, a smaller lock has been used to connect the camera 10 to plastic bezel 276, the previous device having a portion engaging with one of the longitudinal recesses 302 in the sides of the plastic bezel. It has been found with this arrangement, however, that exertion of an outside force on camera 10, such as by a person leaning on camera 10 or brushing by it, creates a great deal of stress on plastic bezel 276 causing it to break and thus rendering the mounting arrangement unusable. This problem is avoided in the present device by providing a larger lock arranged such that shaft 286 thereof extends beyond plastic bezel 276 which is usually used for mounting and extends instead to the metal bezel support 296 for locking cooperation with a recess therein. The metal bezel support and recesses 298 in the side thereof are standard features on the types of cathode ray tube device with which the camera of the present invention is intended to be used.

To effect focusing of camera 10, there is provided an opening 304 in wall 62 of base portion 22, the opening 304 being inclined with respect to the outside surface of wall 62 and disposed such that the axis of opening 304 extends toward the cathode ray tube screen 16. A focusing lens 306 is disposed in opening 304, through which lens cathode ray tube 16 may be viewed when a closure 308 is pivotally moved away from opening 304 as shown in the dotted line position of FIG. 2. When focusing has been completed, closure 308 will be pivoted back over opening 304 to block the entry of light from the exterior into the interior 66 of base portion 62.

The preferred method of focusing utilizing focusing lens 306 involves placing of a special focusing cassette, comparable in its configuration to film cassette 32, over the large opening 30 at the upper end of enclosure 18. The focusing cassette includes its own light source and a pattern which is projected by the light source through the optical elements of the camera in the reverse direction from which the image on the cathode ray tube is projected. The operator sights this special focusing pattern through focusing lens 306 on screen 16 and brings the same into focus by adjustment of the lens position with the manual adjusting stem 212. An advantage of this type of focusing method over known methods using a ground glass cassette in place of the film cassette is that a much more intense light source may be used in this method. In this regard, the light intensity from the cathode ray tube itself tends to be rather weak thus making focusing on a ground glass screen difficult.

It will be understood that the actual exposure of the sheets of film 34 in film cassette 32 is accomplished by first removing flat dark slide 90 which faces toward the interior 26 of enclosure 18. One sheet of film is then exposed to interior 26 and the image from the cathode ray tube 16 is protected onto the film by the optical elements previously described. The exposure time is preferably controlled by the cathode ray tube device 12 itself. The type of cathode ray tube device for which the present camara is intended includes the capability of timing the duration of the light display for virtually any time interval desired. Thus, the desired exposure time is set by the proper adjustment of the cathode ray tube device 12. Therefore, no shutter is required in the camera of the present invention.

Of course, when the camera of the present invention is used in connection with an instrument which does not have the foregoing time display capabilities, a lens assembly having a shutter device therein may be substituted for lens 190. In this regard, lens assemblies with suitable shutter arrangements incorporated therein are available commercially.

The lens 190 used in the preferred embodiment is a 105 mm lens, but uses of other lenses including lenses having focal lengths of 106 mm and 112 mm are intended. One lens intended for use includes a variable aperture means associated therewith (as is common commercially) for added flexibility in the manner of exposing the film.

Although the present invention has been described in connection with a certain specific, preferred embodiment, it will be apparent to those skilled in the art that many modifications, variations and other embodiments of the invention will be possible without departing from the spirit and scope of the invention as defined in the appended claims.

What is claimed is:

1. A camera to be mounted adjacent a cathode ray tube device having a cathode ray tube therein to record an image from a screen of the cathode ray tube, the camera comprising:

a generally rectangular film cassette having sheets of rectangular film therein to be exposed, said film cassette having four lateral edges and a pair of oppositely facing sides;

an enclosure having an interior and an exterior, said enclosure also having first and second openings to said exterior of said enclosure, said first opening being at least as large in area as the screen of the cathode ray tube, said second opening being at least as large in area as the area of said film to be exposed;

a lens in said enclosure, said lens being disposed between said first and second openings in said enclosure;

means, in the region of said first opening, for mounting said enclosure adjacent the cathode ray tube device and in surrounding relationship with the screen thereof;

means for removably positioning said film cassette adjacent said second opening, said film cassette being removably positioned in a working position across said second opening such that a major portion thereof serves as a closure for closing said second opening between the interior and exterior of the enclosure; said positioning means including:

a stationary holder extending from said enclosure for holding at least one part of said film cassette with respect to said second opening;

movable attaching means including a movable latch, said movable attaching means being coupled with said enclosure and disclosed for engagement of said movable latch with a part of said cassette other than said one part which is engaged by said holder, said latch having a portion extending outwardly with respect to said enclosure and a catch portion on said outwardly extending portion, said latch being movable between a latched position engaging said cassette and an unlatched position out of engagement with said cassette, thus permitting removal of said cassette from its working position covering said second opening, said movable attaching means including means for biasing said latch into said latched position and means for both holding said latch in said unlatched position after manual movement of said latch into said unlatched position and also for automatically releasing said latch from said unlatched position upon movement of said film cassette into the working position to thereby allow movement of said latch into said latched position and thus into gripping engagement with said film cassette.

2. A camera as defined in claim 1:

including an outer surface surrounding said second opening, said outer surface engaging said film cassette when said film cassette is in a working position; and wherein said holding and automatic releasing means includes:

a movable control member having a bearing portion in the region of one end of the control member, an actuating button portion adjacent the other end, and a grooved portion between said bearing portion and actuating button portion;

a bore through said outer surface, said bore receiving said control member for restraining the same to linear movement;

means for biasing said control member outwardly in a direction out of said bore;

a latch positioning member mounted on said latch and extending from said latch to said control member for cooperation both with said grooved portion thereof and said bearing portion thereof;

a retaining member in said enclosure cooperating with said grooved portion to retain said control member in said bore and limit linear movement of said control member within said bore;

said control member being movable between a first position in which said button portion protrudes from said outer surface and a second position in which said button portion is approximately flush with said outer surface;

whereby manual movement of said latch into the unlatched position moves said latch positioning member out of engagement with said grooved portion to permit movement of said control member into said first position so that said button portion thereof moves outwardly to push said film cassette slightly away from the outer surface to facilitate removal of the cassette, said latch positioning member thereupon engaging said bearing portion to hold said latch in said unlatched position, and whereby manual pressing of said film cassette into the working position depresses said button portion and moves said control member into said second position in which said latch positioning member drops into said grooved portion thus allowing said latch to move into said latched position under the influence of said latch biasing means.

3. A camera as defined in claim 2 wherein said retaining member and said latch positioning member are misaligned and staggered relative to one another, said retaining member being closer to said outer surface than is said latch positioning member.

4. A camera as defined in claim 2 wherein said latch positioning member is adjustably movable with respect to said latch to effect adjustment of the position of said latch in its latched and unlatched positions.

5. A camera as defined in claim 1 wherein said enclosure includes a separate generally rectangular frame disposed therein in the region of said second opening thereof, one surface of said frame defining said outer surface of said enclosure, said frame including two pairs of oppositely disposed parallel sides, said frame including an inner surface which faces toward said interior of said enclosure and an outer surface which faces said exterior of said enclosure.

6. A camera as defined in claim 5 wherein said latch biasing means includes a spring having two flat parts joining each other and disposed at an obtuse angle with respect to each other when said latch biasing means is in a relaxed condition, one flat part engaging said inner surface of said frame and being affixed thereto by fasteners, the other of said spring parts engaging said latch in unaffixed abutting relationship therewith, whereby said other spring part is free to slide with respect to said latch during movement of said latch between the latched and unlatched positions.

7. A camera as defined in claim 5 wherein said latch is disposed in generally parallel relationship with one of said sides of said frame, said latch and said catch portion thereof being elongated in the direction of said one side of said frame to extend along said one side of said frame.

8. A camera as defined in claim 7 wherein said latch includes an enlarged pivot base disposed opposite said catch portion, and said extending portion extends between said pivot base and said catch portion, said extending portion being in the form of a web between said pivot base and said catch portion.

9. A camera as defined in claim 8 wherein said frame includes a channel in said frame adjacent said inner surface thereof and at said one side thereof, said channel extending generally parallel to said one side of said frame, said frame including ears on either end of said channel, which ears are upstanding with respect to said channel, said pivot base of said latch being disposed in said channel for accommodating pivotal movement of said latch with respect to said frame, said ears retaining said latch against longitudinal movement in the direction of said channel and providing hinging areas for said pivot base of said latch.

10. A camera as defined in claim 5 wherein said catch portion of said latch has a sloping surface disposed at an obtuse angle with respect to said extending portion of said latch, said sloping surface engaging said cassette and facing generally toward said outer surface of said frame but being inclined with respect thereto, said sloping surface urging said cassette against said outer surface once said latch is in the latched position.

11. A camera as defined in claim 5 wherein said stationary holder comprises an arm portion extending outwardly from said frame, said arm portion having an outer lip thereon for engagement with said film cassette.

12. A camera as defined in claim 11 wherein said lip forms an obtuse angle with respect to said arm portion, said lip thus providing an inclined surface for engaging said cassette in such a manner as to urge said cassette into tight engagement with said outer surface of said frame.

13. A camera as defined in claim 1 wherein the cathode ray tube device has a mounting bezel thereon surrounding the screen and wherein said mounting means includes a camera bezel surrounding said first opening and configured for face-to-face, light-sealing engagement with the mounting bezel of the cathode ray tube device.

14. A camera as defined in claim 13 wherein said mounting means also includes a lock coupled with said enclosure and extending outwardly therefrom for engagement with the cathode ray tube device, said lock including:

a portion fixed with respect to the enclosure, the fixed portion having a shaft opening therethrough;
a shaft extending through said shaft opening, said shaft having a first end on one side of the fixed portion adjacent which there is disposed a manual grip device, and a second end, spaced from said fixed portion, adjacent which end there is disposed a pawl for locking cooperation with the cathode ray tube device, said pawl extending generally transversely of said shaft, said shaft having an extension which extends between said fixed portion of the lock and said pawl a sufficient distance such that said shaft extends beyond the bezel of the cathode ray tube device and said pawl is disposed to engage another portion of the cathode ray tube device.

15. A camera to be mounted adjacent a display surface of an instrument for recording on film an image on the display surface, the film being disposed in a film cassette, the camera comprising:

an enclosure having an interior and an exterior, said enclosure having first and second openings to the exterior of said enclosure, said first opening being at least as large in area as the display surface from which an image is to be recorded, said second opening being at least as large in area as the area of film to be exposed;

a lens in said enclosure, said lens being disposed between said first and second openings;

means, in the region of said first opening, for mounting said enclosure on said instrument in surrounding relationship with respect to the display surface thereof;

a movable latch on said enclosure adjacent said second opening thereof for securing the film cassette across the second opening to close said second opening;

means for biasing said latch into a latched position in which the film cassette is held in place across said second opening of said enclosure said latch being movable into an unlatched position out of engagement with the cassette and in which the cassette may be removed; and means for both holding said latch in said unlatched position after manual movement of said latch thereinto and also for automatically releasing said latch from said unlatched position upon movement of the cassette into its position across the second opening to allow movement of said latch into said latched position and thus into gripping engagement with the film cassette.

16. A camera to be mounted adjacent a cathode ray tube device having a cathode ray tube therein to record an image from a screen of the cathode ray tube, the camera comprising:

a generally rectangular film cassette having sheets of rectangular film therein, said film cassette having four lateral edges and a pair of oppositely facing sides;

an enclosure having an interior and exterior, said enclosure having first and second openings to said exterior of said enclosure, said first opening being at least as large in area as the screen of a cathode ray tube, said second opening being at least as large in area as the area of the film to be exposed;

a lens in said enclosure, said lens being disposed between said first and second openings in said enclosure;

means, in the region of said first opening, for mounting said enclosure adjacent the cathode ray tube in surrounding relationship with the screen thereof;

said film cassette having a working position in which said film cassette extends entirely across said second opening to close said second opening to said exterior, one side of said cassette facing said exterior;

said enclosure including a main body portion and a separate, inner rectangular frame attached to said main body portion in spaced relationship thereto, said inner frame being coupled with said main body portion by coupling means, said inner frame generally surrounding said second opening and having a frame opening generally coextensive with said second opening;

said inner frame having a flat, outer surface for face-to-face disposition with respect to the other side of said film cassette when said cassette is in a working position covering said second opening, said outer surface being disposed in a plane;

said coupling means including a plurality of spaced biasing means between said main body portion of said enclosure and said inner frame, said biasing means urging said frame outwardly away from said main body portion;

said coupling means also including a plurality of adjustable fastening means extending between said main body portion and said inner frame, said adjustable fastening means opposing the outward urging of said inner frame by said biasing means and adjustably limiting the extent to which said inner frame is spaced from said main body portion;

whereby said inner frame assumes a floating relationship with respect to said main body portion and whereby said plane of said outer surface of said inner frame may be adjustably moved with respect to said main body portion to effect proper focusing over the entire surface area of the film of said cassette.

17. A camera as defined in claim 16 wherein said frame has:

a movable latch thereon, said movable latch including a portion extending outwardly from said frame in a direction away from said main body portion and toward said cassette and a catch portion disposed outwardly of said extending portion, said latch being movable between a latched position wherein said catch engages one part of said cassette and an unlatched position out of engagement with said cassette thus permitting removal of said cassette;

means coupled with said frame for biasing said latch into said latched position;

said frame including means for holding said latch in said unlatched position after manual movement thereinto and also for automatically releasing said latch from said unlatched position upon movement of said cassette into its working position to allow movement of said latch into said latched position and thus into gripping engagement with said film cassette.

18. A camera as defined in claim 17 wherein said holding and automatic releasing means includes:

a movable control member having a grooved portion, a bearing portion and an actuating button portion;

a bore through said outer surface, said bore receiving said control member for restraining the same to linear movement in a direction perpendicular to said outer surface of said inner frame;

means for biasing said control member outwardly in a direction out of said bore;

a latch positioning member mounted on said latch and extending from said latch to said control member for cooperation both with said grooved portion thereof and said bearing portion thereof;

a retaining member cooperating with said grooved portion to retain said control member in said bore and limit linear movement of said control member within said bore;

said control member being movable between a first position in which said button portion protrudes from said outer surface of said frame and a second position in which said button portion is approximately flush with said outer surface of said frame;

whereby manual movement of said latch into the unlatched position moves said latch positioning member out of engagement with said grooved portion to permit movement of said control member into said first position so that said button portion thereof moves outwardly to push said film cassette slightly away from said outer surface of said frame to facilitate removal, said latch positioning member thereupon engaging said bearing portion to hold said latch in said unlatched position, and whereby manual pressing of said film cassette into the working position depresses said button portion and moves said control member into said second position in which said latch positioning member drops into said grooved portion thus allowing said latch to move into said latched position under the influence of said latch biasing means.

19. A camera for mounting adjacent a display surface of an instrument to record an image on the display surface with film, the film being disposed in a film cassette, the camera comprising:

an enclosure having an interior and an exterior, said enclosure having first and second openings to the exterior of said enclosure, said first opening being at least as large in area as the display surface from which an image is to be recorded, said second opening being at least as large in area as the area of film to be exposed;

a lens in said enclosure, said lens being disposed between said first and second openings;

means, in the region of said first opening, for mounting said enclosure on said instrument in surrounding relationship with respect to the display surface thereof;

said enclosure including a main body portion and a separate, inner rectangular frame attached to said main body portion of said enclosure in spaced relationship thereto, said inner frame being coupled with said main body portion by coupling means, said inner frame generally surrounding said second opening and having a frame opening generally coextensive with said second opening;

said inner frame having a flat, outer surface for face-to-face disposition with respect to the film cassette when the film cassette is in a working position closing the second opening;

said coupling means including a plurality of spaced biasing means between said main body portion of said enclosure and said inner frame, said biasing means urging said frame outwardly away from said main body portion;

said coupling means also including a plurality of adjustable fastening means extending between said main body portion and said inner frame, said adjustable fastening means opposing the outward urging of said inner frame by said biasing means and adjustably limiting the extent to which said inner frame is spaced from said main body portion;

said frame having:

a movable latch thereon, said movable latch including a portion extending outwardly from said frame in a direction away from said main body portion and toward the cassette and a catch portion disposed outwardly of said extending portion, said latch being movable between a latched position wherein said catch portion engages said cassette and an unlatched position out of engagement with said cassette thus permitting removal of the cassette;

means coupled with said frame for biasing said latch into said latched position;

means for holding said latch in said unlatched position after manual movement thereinto and also for automatically releasing said latch from said unlatched position upon movement of said cassette into its working position to allow movement of said latch into said latched position and thus into gripping engagement with the film cassette.

20. A camera as defined in claim 19 wherein said holding and automatic releasing means includes:
    a movable control member having a grooved portion, a bearing portion, and an actuating button portion;
    a bore through said outer surface, said bore receiving said control member for restraining the same to linear movement in a direction perpendicular to said outer surface of said frame;
    means for biasing said control member outwardly in a direction out of said bore;
    a latch positioning member mounted on said latch and extending from said latch to said control member for cooperation both with said grooved portion thereof and said bearing portion thereof;
    a retaining member cooperating with said grooved portion to retain said control member in said bore and limit linear movement of said control member within said bore;
    said control member being movable between a first position in which said button portion protrudes from said outer surface of said frame and a second position in which said button portion is approximately flush with said outer surface of said frame;
    whereby manual movement of said latch into the unlatched position moves said latch positioning member out of engagement with said grooved portion to permit movement of said control member into said first position so that said button portion thereof moves outwardly to push the film cassette slightly away from said outer surface to facilitate removal, said latch positioning member thereupon engaging said bearing portion to hold said latch in said unlatched position, and whereby manual pressing of the film cassette into the working position depresses said button portion and moves said control member into said second position in which said latch positioning member drops into said grooved portion thus allowing said latch to move into said latched position under the influence of said latch biasing means.

21. A camera to be mounted adjacent a display surface of an instrument to record an image on the display surface, the camera utilizing a film cassette containing sheets of film to effect such recording, the camera comprising:
    an enclosure having an interior and an exterior, said enclosure having first and second openings to the exterior of said enclosure, said first opening being at least as large in area as the display surface from which an image is to be recorded, said second opening being adapted for receiving the film cassette;
    means, in the region of said first opening, for mounting said enclosure on said instrument in surrounding relationship with respect to the display surface thereof;
    an optical unit coupled with said enclosure and disposed at least partially therewithin, said optical unit being separable as a unit from said enclosure, said optical unit having first and second ends and a bed portion extending between said first and second ends;
    said optical unit having a pair of mirror mounting portions extending from said bed portion in inclined relationship therewith, said mirror mounting portions being spaced apart and disposed adjacent the opposite ends of said optical unit, said optical unit comprising:
    a first mirror on one of said mounting portions, said first mirror being disposed adjacent said first end of said bed portion for receiving an image through said first opening of said enclosure;
    a second mirror on the other mirror mounting portion and disposed adjacent to said second end of said optical unit for receiving the image after it is reflected by the first mirror and for reflecting the image;
    a lens mounted on said bed portion and disposed between said first and second mirrors, said lens being adjustably movable with respect to said bed portion;
    whereby said optical unit is a unitary optical subassembly which may be preassembled and adjusted as a unit, installed in said enclosure as a unit, and removed from said enclosure as a unit.

22. A camera as defined in claim 21 wherein each of said mirrors is attached to a mirror mounting plate, each mirror mounting plate being connected with one of said mirror mounting portions of said optical unit by connecting means, said connecting means including a set of spaced biasing means between each mirror mounting portion and mirror mounting plate, each said set of biasing means urging one mirror mounting plate outwardly away from its associated mirror mounting portion, said connecting means also including a set of adjustable fasteners extending between each mirror mounting portion and each mirror mounting plate, said adjustable fasteners opposing the outward urging of each mirror mounting plate by said biasing means to establish the position of each said mirror mounting plate and thus the position of its attached mirror with respect to each associated mirror mounting portion.

23. A camera as defined in claim 22 wherein each mirror mounting portion and associated mirror mounting plate includes three spaced biasing means and three spaced fasteners therebetween to thus provide a three point adjustment for adjusting the plane in which each mirror is disposed.

24. A camera as defined in claim 21 wherein said optical unit includes a lens mounting barrel on a track, said tack including a rack and pinion drive coupled therewith, said lens being mounted in said lens mounting barrel, said rack and pinion drive including a manual adjusting stem extending from said interior to said exterior of said enclosure, whereby manual rotation of said adjusting stem actuates said rack and pinion drive to drive said lens mounting barrel along said track to effect focusing of said lens.

25. A camera as defined in claim 21:
wherein said enclosure includes a wall extending across said base portion in said interior of said enclosure, said wall being of one piece with said base portion, said wall including a passage therethrough, said wall preventing any light which enters said enclosure through said first opening from passing beyond said wall except such light as passes through said passage in said wall;

said passage being generally aligned with said lens barrel;

including a light-impervious bellows extending between said lens barrel and said passage in said wall, said bellows surrounding said lens and mating with said passage in said wall in light-sealing engagement therewith;

whereby substantially all light entering said enclosure through said first opening and reflecting off one of said mirrors, passes through said passage in said wall and travels through said bellows to said lens without leakage.

26. A camera as defined in claim 21 wherein said bed portion has a portion with a central opening therein and another portion, adjacent said centrally open portion, which has a closed, plate-like configuration.

27. A camera as defined in claim 26 wherein said bed portion of said optical unit defines part of said enclosure.

28. A camera as defined in claim 27 wherein said enclosure includes a portion in an attachment plane which is parallel with and closely adjacent to the display surface of the instrument when the camera is mounted for use, said first opening of said enclosure being disposed generally in said attachment plane, said base portion of said enclosure including one face which is exposed to said exterior and spaced from the instrument when the camera is mounted for use, said face being disposed generally in said attachment plane, said one face being at least partially provided by said closed portion of said bed portion of said optical unit, said first opening of said enclosure being defined by said centrally open portion of said bed.

29. A camera as defined in claim 27 wherein said display surface is a screen of a cathode ray tube and said instrument includes a mounting bezel surrounding the cathode ray tube, said mounting means including a camera bezel which is shaped for mating engagement with the mounting bezel of the cathode ray tube, said centrally open portion of said bed of said optical unit including said mounting bezel.

30. A camera as defined in claim 26 wherein said mounting means includes a lock for engaging with the instrument to attach the camera thereto, said lock including:

a portion fixed on said open portion of said bed portion of said optical unit and extending outwardly therefrom away from said central opening of said open portion, said fixed portion having a shaft opening therethrough;

a shaft extending through the shaft opening, the shaft having a first end on one side of the fixed portion adjacent which there is disposed a manual grip device, and a second end, spaced from said fixed portion, adjacent which second end there is disposed a pawl for locking cooperation with the instrument, the pawl extending generally transversely of the shaft.

31. A camera as defined in claim 21 wherein in said enclosure comprises at least two pieces including a base portion in which said first opening is disposed and a main housing portion in which said second opening is disposed, said optical unit extending between said base portion and main housing portion in said enclosure.

32. A camera as defined in claim 31 wherein said first mirror is disposed in said base portion and said second mirror is disposed in said main housing portion, said mirrors and said lens being mutually so disposed in said enclosure and in said optical unit that an image received on said first mirror is transmitted through said lens and then to said second mirror.

33. A camera as defined in claim 31 wherein said lens is at least partially disposed in said base portion.

34. A camera to be mounted adjacent a cathode ray tube device which has a cathode ray tube with a screen for recording with film an image on the screen, the cathode ray tube device including a bezel area having a plastic mounting bezel surrounding the screen of the cathode ray tube and a metal bezel support in which the plastic mounting bezel is mounted, the metal bezel supporting including a plurality of side members each having a longitudinal recess therein, the camera comprising:

an enclosure having an interior and an exterior, said enclosure having an opening to the exterior of said enclosure, said opening being at least as large in area as the screen of the cathode ray tube;

a lens in said enclosure;

means, in the region of said first opening, for mounting said enclosure on said cathode ray tube device in surrounding relationship with respect to the screen of the cathode ray tube, said mounting means including:

a mounting face surrounding said opening;

said mounting face including a camera bezel, said camera bezel comprising a recessed face in said mounting face, said recessed face being defined by a shoulder around said recessed face, said recessed face and said shoulder both being for supporting said camera on the plastic mounting bezel of the cathode ray tube device;

a lock on said enclosure at the lower end thereof and disposed adjacent said mounting face for removably securing the camera to the cathode ray tube bezel area; said lock including:

a portion fixed with respect to said enclosure, said fixed portion having a shaft opening therethrough;

a shaft extending through said shaft opening, said shaft having a first end on one side of said fixed portion and adjacent which there is disposed a manual gripping means and having a second end spaced from said fixed portion and adjacent which end there is disposed a pawl for locking cooperation with one of said recesses of the metal bezel support, said pawl extending generally transversely of said shaft, said shaft having an extension which extends between said fixed portion of said lock and said pawl thereof a sufficient distance such that said pawl is positioned for cooperation with the longitudinal recess in one of the side members of the metal bezel in use and thus extends beyond the plastic mounting bezel of the cathode ray tube device.

* * * * *